Feb. 10, 1925.

C. C. PRIM

RIDING ROW CROP GATHERER

Filed May 8, 1924

INVENTOR
C. C. Prim
Watson E. Coleman
ATTORNEY

Feb. 10. 1925. 1,525,886
C. C. PRIM
RIDING ROW CROP GATHERER
Filed May 8, 1924 2 Sheets-Sheet 2
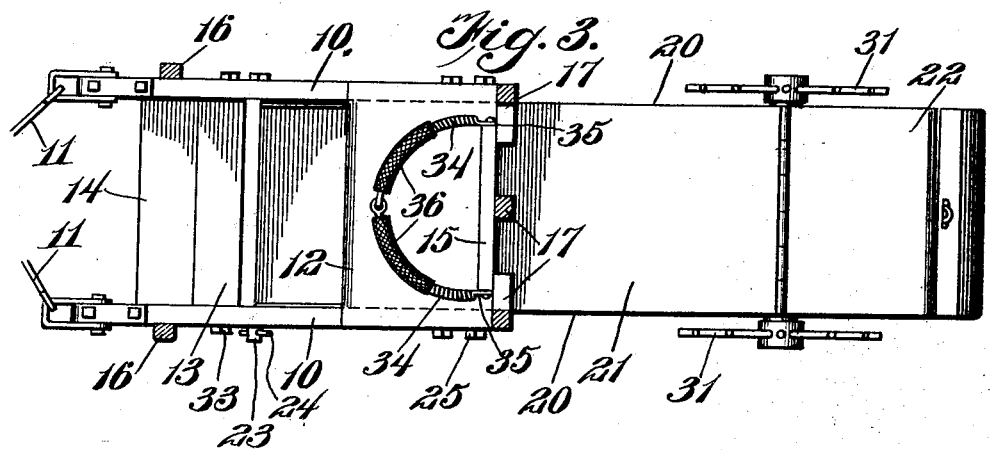
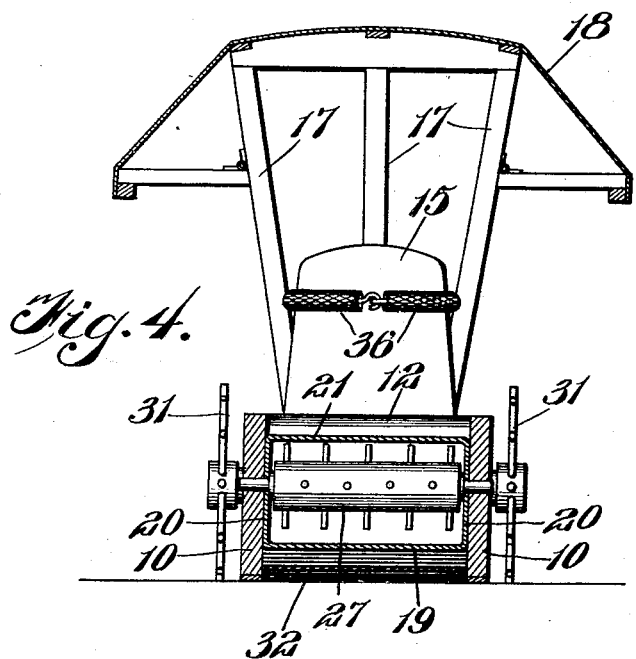
INVENTOR
C. C. Prim
Watson E. Coleman
ATTORNEY Patented Feb. 10, 1925.

1,525,886

UNITED STATES PATENT OFFICE.

CLEM C. PRIM, OF CUMBY, TEXAS.

RIDING ROW-CROP GATHERER.

Application filed May 8, 1924. Serial No. 711,876.

*To all whom it may concern:*

Be it known that I, CLEM C. PRIM, a citizen of the United States, residing at Cumby, in the county of Hopkins and State of Texas, have invented certain new and useful Improvements in Riding Row-Crop Gatherers, of which the following is a specification, reference being had to the accompanying drawings.

This invention relates to crop gathering machines of that type wherein a vehicle, as it may be called, is provided which is moved between the crop rows, the operator sitting within the vehicle and picking the crop and discharging it into a receptacle carried on the vehicle.

One of the objects of the present invention is to provide a structure of this character having therein a longitudinally extending and somewhat trailing receptacle which is detachable from what may be termed the vehicle or body of the machine so that the receptacle may be readily dumped.

A further object is to provide a receptacle of this character with a conveyor operating therein and designed to carry the crop discharged into the forward end of the receptacle into the larger or gathering end thereof, and to provide wheels operated by engagement with the ground for shifting said conveyor.

A still further object is to provide means for preventing the conveyor from wearing by its constant contact with the ground.

Another object is to provide means for supporting the operator when he reaches out to gather the crop and to take strain off his muscles in so doing.

Other objects will appear in the course of the following description.

My invention is illustrated in the accompanying drawings, wherein:—

Figure 3 is a top plan view;

Figure 4 is a section on the line 4—4 of Figure 2;

Figure 1:
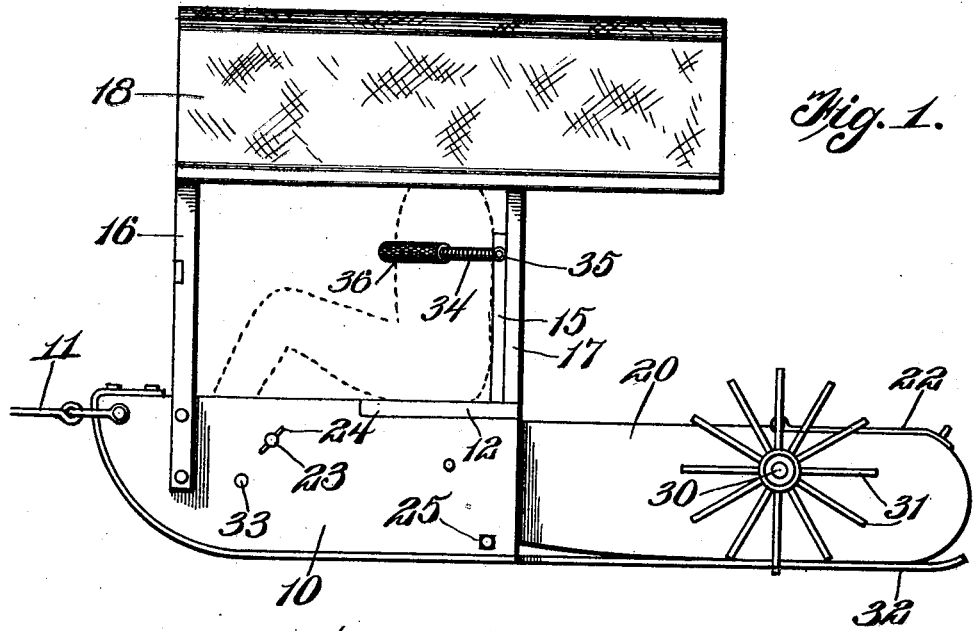
Figure 1 is a side elevation of a crop gatherer constructed in accordance with my invention.

Referring to these drawings, it will be seen that my machine comprises a vehicle or body, which in turn consists of two parallel sled runners 10, these sled runners being connected by suitable braces and held in proper spaced relation and having at their forward ends the draft connections 11 of any suitable kind. There is a seat 12 which is mounted upon the runners and extends transversely thereacross, and an upwardly and rearwardly slanting leg board 13 with a foot board 14. This leg board 13 is spaced from the seat 12. A back 15 extends upward back of the seat, and mounted upon the runners is any suitable superstructure as, for instance, the uprights 16 and the upwardly divergent supports 17, which in turn support a canopy or hood 18. The frame for supporting this canopy or hood and the hood itself may be of any suitable construction.

Disposed with its forward end between the runners is a collecting receptacle in the form of a trough having a bottom 19 and side walls 20 and also having a top wall 21 which extends from the forward end of the receptacle nearly to the rear end thereof. To the rear end of this top wall 21 is hinged a cover 22. The forward end of this receptacle is detachably supported and engaged with the sled runners by means of a transverse bolt 23 which is preferably made with a key or keys 24 so that by knocking out one key the bolt may be readily withdrawn to thus detach the collecting receptacle or trough from its engagement with the runners and permit the collecting receptacle to be withdrawn and discharged. Preferably a transverse bolt or rod 25 extends between the runners and beneath the bottom 19 of the receptacle and acts to support the forward end of the receptacle and also to hold the runners in spaced relation.

Figure 2:
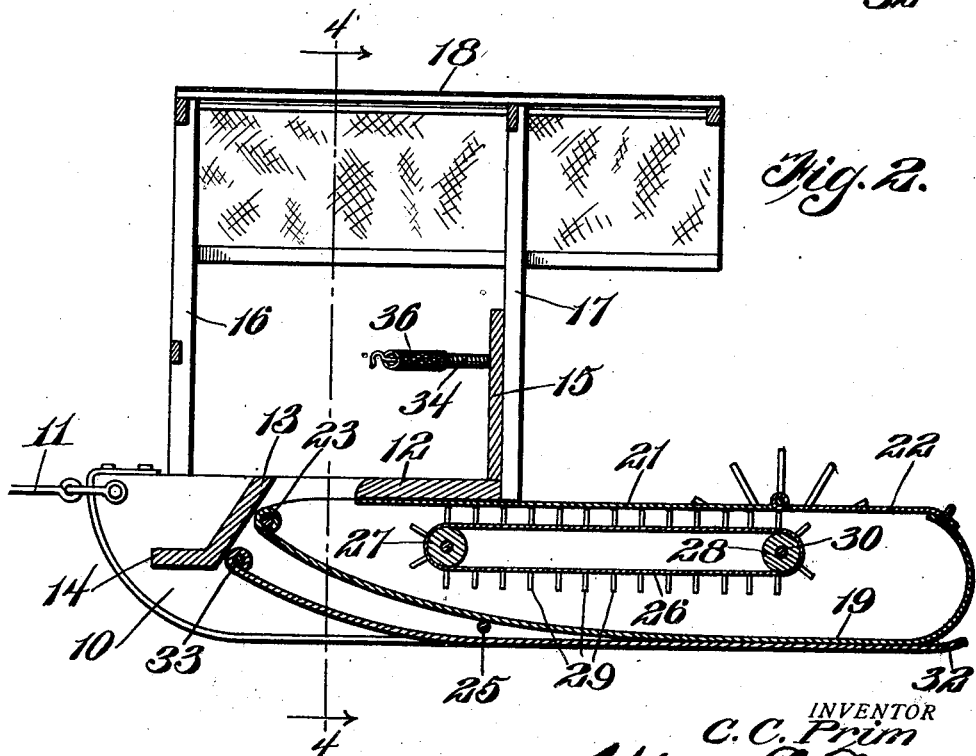
Figure 2 is a longitudinal sectional view through the machine.

It will be seen from Figure 2 that the receptacle is relatively shallow at its forward end and that the bottom 19 curves downward and rearward and that the receptacle is depressed at its rear end. Disposed within the receptacle or collecting trough is an endless conveyor 26. This conveyor at its forward end is mounted upon a roller 27 and at its rear end is mounted upon a roller 28. This endless conveyor may be in the form of sprocket chains, a canvas conveyor, or be of any other suitable construction, but it is provided with outwardly projecting teeth, lugs or pins 29 preferably extending in rows across the belt of the conveyor. The roller 28 is mounted upon a shaft 30 which carries upon it the radiating relatively long pins 31 which are adapted to engage in the ground as the machine moves forward, thus acting to rotate the shaft and thus operate the conveyor and cause the lower flight of the conveyor to move down over the surface of the bottom 19 and carry the material deposited on the forward end of the collecting trough rearward into the large and rear end thereof.

Preferably and in order to prevent excessive wear coming upon the bottom of the conveyor, I provide a sheet metal wear plate 32 which is pivotally mounted upon a transverse bolt 33 extending through the forward ends of the runners, this wear plate extending rearward beneath the whole of the bottom 19 and bearing against the ground so that this bottom 19 is not in contact with the ground and, therefore, cannot become worn. It is obvious that the sheet metal plate may be replaced at any time and that other tractive means might be used.

It will be noted from the drawings that the forward end of the collecting trough is disposed immediately beneath the upper end of the foot board 13 and that the elevator terminates short of the forward edge of the seat so that the operator sitting on the seat with his legs on the foot board will spread his legs apart and, therefore, can throw the material gathered into the collecting trough between his legs. The operator leans out on opposite sides of the machine to gather the cotton, beans or other crop and this places considerable strain upon him. In order to relieve his muscles of this strain, it is preferable to provide a supporting belt, designated generally 34, which is attached to the seat back 15 and which preferably consists of one or two contractile springs which are adapted to be engaged with each other and detachably engaged with the seat back by means of eyes 35. A covering as, for instance, a rubber covering or a covering of any other cushioning material, designated 36, may be used to prevent the springs from chafing or rubbing against the operator. I do not wish to be limited to the use of this device nor to the particular form of the construction, as it is obvious that this might be changed.

In the practical use of this crop gatherer, the gatherer is adapted to be drawn between the rows of crops, having a width just sufficient for this purpose, and as it is drawn slowly along, the operator sitting on the seat 12 reaches out and picks the crop and throws it into the forward end of the receptacle and by reason of the slanting bottom of the receptacle the material tends to slide or roll rearward into the larger end of the receptacle and this is assisted, of course, by the conveyor 26. When the rear end of the receptacle is full, the bolt 23 is removed and then the receptacle can be readily lifted up or turned over or otherwise emptied and then re-connected to the sled and the operation repeated.

It is obvious that with this device there might be a number of receptacles for each body so that one receptacle could be drawn away, if necessary, for emptying while another receptacle was fastened to the body and the picker was continuing his work. Of course, it will be obvious that the device will be constructed of different heights for different sized crops and that there might be many variations in detail without departing from the spirit of the invention. The structure is particularly adapted for the gathering of cotton and also may be used with effect for any row crop such, for instance, as maize, beans, peas, popcorn, potatoes, etc. The potatoes and like articles slide or roll very readily toward the rear end of the collecting receptacle, while the conveyor acts to carry cotton, peas and beans or other light articles to the rear.

I claim:—

1. A gathering or harvesting machine of the character described comprising a body open at its rear end and adapted to ride over the ground and having a seat, and a collecting receptacle detachably connected to the body and extending forward within the body with its forward end disposed beyond the forward edge of the seat and being open at this point whereby material gathered by the seated operator may be placed in the receptacle.

2. A gathering or harvesting machine of the character described comprising a body adapted to ride over the ground and having a seat, a collecting receptacle detachably connected to the body and extending forward beyond the forward edge of the seat and being open at this point, a conveyor disposed within the body and operating to carry the materials deposited in the forward end rearward, and rotatable means mounted upon the body and engaging the ground whereby the conveyor may be shifted.

3. A gathering or harvesting machine of the character described comprising a body having a seat and including laterally spaced members, a collecting receptacle extending beneath the body and between said members and beyond the forward edge of the seat, the forward end of the body being open at the top, a conveyor operating within the body and being disposed with its forward end rearward of the seat and its rear end forward of the rear end of the receptacle, and ground engaging means for operating said conveyor.

4. A gathering or harvesting machine of the character described comprising a body having a seat and including laterally spaced members, a collecting receptacle extending beneath the body and between said members and beyond the forward edge of the seat, the forward end of the body being open at the top, a conveyor operating within the body and being disposed with its forward end rearward of the seat and its rear end forward of the rear end of the receptacle, and ground engaging means for operating said conveyor, the receptacle being detachably connected at its forward end to the body.

5. A gathering or harvesting machine comprising a body having laterally spaced sled runners, a seat mounted upon the body, a collecting receptacle having a bottom, sides and a top, the forward end of the collecting receptacle being disposed between the sled runners and extending beyond the seat and being detachably connected to the runners, the top terminating short of the forward edge of the seat, the bottom of the receptacle extending downward and rearward and the rear end of the receptacle having a cover.

6. A gathering or harvesting machine comprising a body having laterally spaced sled runners, a seat mounted upon the body, a collecting receptacle having a bottom, sides and a top, the forward end of the collecting receptacle being disposed between the sled runners and extending beyond the seat and being detachably connected to the runners, the top terminating short of the forward edge of the seat, the bottom of the receptacle extending downward and rearward and the rear end of the receptacle having a cover, an endless conveyor disposed within the receptacle and terminating short of the forward end thereof and of the rear end thereof, and ground engaging means for driving said conveyor.

7. A gathering or harvesting machine comprising a body having laterally spaced sled runners, a seat mounted upon the body, a collecting receptacle having a bottom, sides and a top, the forward end of the collecting receptacle being disposed between the sled runners and extending beyond the seat and being detachably connected to the runners, the top terminating short of the forward edge of the seat, the bottom of the receptacle extending downward and rearward and the rear end of the receptacle having a cover, and a wear plate hingedly connected at its forward end between the runners and extending longitudinally beneath the collecting receptacle.

8. A gathering and harvesting machine of the character described comprising a body having spaced runners and a seat, a collecting receptacle extending between the runners and having its forward end extending beyond the seat and being detachably connected to the runners, the receptacle having a top terminating short of the forward end of the receptacle and of the rear end of the receptacle, a hinged cover for the rear end of the receptacle, an endless conveyor mounted within the receptacle with its forward end rearward of the forward end of the receptacle and its rear end terminating short of the rear end of the receptacle, a shaft for operating the conveyor extending beyond the sides of the receptacle and having radially extending ground engaging pins, and a wear plate hingedly mounted upon the runners and extending rearward beneath the bottom of the collecting receptacle.

9. A crop gathering and harvesting machine of the character described comprising a supporting body having ground engaging members, a collecting receptacle extending rearward from the body, the body having a seat, a leg support spaced from the forward edge of the seat, the collecting receptacle extending to said leg support and beneath the seat, and ground engaging means causing the material disposed within the forward end of the receptacle to be carried rearward to the rear end thereof.

In testimony whereof I hereunto affix my signature.

CLEM C. PRIM.